(12) United States Patent
Zhang et al.

(10) Patent No.: US 9,746,620 B2
(45) Date of Patent: Aug. 29, 2017

(54) EXPANDED BEAM CONNECTOR, OPTICAL CABLE ASSEMBLY, AND METHOD OF MANUFACTURING

(71) Applicant: TYCO ELECTRONICS CORPORATION, Berwyn, PA (US)

(72) Inventors: Haipeng Zhang, Newark, CA (US); Jibin Sun, Redwood City, CA (US); Terry Patrick Bowen, Dillsburg, PA (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

(21) Appl. No.: 14/959,956

(22) Filed: Dec. 4, 2015

(65) Prior Publication Data

US 2017/0160490 A1 Jun. 8, 2017

(51) Int. Cl.
*G02B 6/38* (2006.01)
*G02B 6/14* (2006.01)

(52) U.S. Cl.
CPC ............ *G02B 6/3846* (2013.01); *G02B 6/14* (2013.01); *G02B 6/3845* (2013.01); *G02B 6/3885* (2013.01)

(58) Field of Classification Search
CPC .. G02B 6/3846; G02B 6/3845; G02B 6/3885; G02B 6/14
See application file for complete search history.

(56) References Cited

U.S. PATENT DOCUMENTS

| 4,076,378 A | * | 2/1978 | Cole .................... G02B 6/4298 385/115 |
| 6,552,301 B2 | | 4/2003 | Herman et al. |
| 7,366,378 B2 | | 4/2008 | Jia et al. |
| 2003/0053756 A1 | * | 3/2003 | Lam .................... G02B 6/1228 385/49 |

(Continued)

OTHER PUBLICATIONS

Zhao et al.; Controllable high-throughout high-quality femtosecond laser-enhanced chemical etching by temporal pulse shaping based on electron density control; Scientific Report; Beijing Institute of Technology, School of Mechanical Engineering; Aug. 2015; 9 pages.

(Continued)

*Primary Examiner* — Ryan Lepisto

(57) ABSTRACT

Expanded beam (EB) connector includes a fiber holder having an alignment channel that is configured to receive an optical fiber. The alignment channel has a channel opening and extends from the channel opening to a channel end face. The EB connector also includes an optical substrate having a three-dimensional (3D) waveguide that includes a waveguide core and a cladding. The optical substrate includes the channel end face. The waveguide core extends lengthwise between first and second coupling faces of the waveguide core. The first coupling face is at least a portion of the channel end face. The first coupling face is configured to optically couple to the optical fiber disposed within the alignment channel. The second coupling face defines an exterior of the optical substrate. The waveguide core is shaped to change a mode field diameter and a numerical (Continued)

aperture of light propagating between the first and second coupling faces.

20 Claims, 9 Drawing Sheets

(56) References Cited

U.S. PATENT DOCUMENTS

2013/0202255 A1 8/2013 Togami et al.
2013/0208358 A1 8/2013 Psaila et al.

OTHER PUBLICATIONS

McMillen, Chen, An, Fleming, Hartwell, and Snoke; Waveguiding and nonlinear optical properties of three-dimensional waveguides in LiTaO3 written by high-repetition rate ultrafast laser; Applied Physics Letters 93,111106 (2008); 4 pages.
Jewart, Wang, Canning, Grobnic, Mihailov and Chen; Ultrafast femtosecond-laser-induced fiber Bragg gratings in air-hole microstructured fibers for high-temperature pressure sensing; Optical Society of America; May 1, 2010; vol. 35, No. 9; pp. 1443-1445.
Huang, Yang and Liu; Femtosecond fiber laser direct writing of optical waveguide in glasses; PolarOnyx, Inc.; 8 pages.
Mitchell, Brown, Thomson, Psaila and Kar; 57 Channel (19×3) Spatial Multiplexer Fabricated using Direct Laser Inscription; Optical Society of America; 2014; 3 pages.
Zakynthinos, Nazarathy, Kaiser, Cincotti, Bayvel, Killey, Angelou, Ezra, Irion, Tolmachev, Saavedra, Hoxha, Grundlehner, Psaila, Vollrath, Magri, Papastergiou and Tomkos; The EU Research Project ASTRON: Advanced Hybrid Integrated Devices to Realize Flexible Terabit Networking; 13 pages.
Vasil'Ev, Epstein et al., and Zakynthinos et al.; Advanced Hybrid Integrated Transceivers to Realize Flexible Terabit Networking; IEEE Photonoic Society News; Feb. 2014; vol. 28, No. 1; 9 pages.
Choudhury, MacDonald and Kar; Ultrafast laser inscription: perspectives on future integrated applications; Wiley Online Library; Laser & Photonics Reviews; 2014; 20 pages.
Huang, Mingshan Li, Chen, Garner, Ming-Jun Li, and Cimo; Ultrafast Laser Fabrication of 3D Photonic Components in Flexible Glasses; Optical Society of America; 2014; 3 pages.

* cited by examiner

EXPANDED BEAM CONNECTOR, OPTICAL CABLE ASSEMBLY, AND METHOD OF MANUFACTURING

BACKGROUND

The subject matter herein relates generally to expanded beam connectors that change a mode field diameter of propagating light to couple an optical fiber to another optical element.

It is often necessary to optically couple discrete optical elements. For example, an optical cable may include a bundle of optical fibers and may be configured to mate with an optical device (or other optical cable). The cable and device may be configured such that the end of each optical fiber aligns with a corresponding optical element of the device. The optical element may include, for example, a lens or another optical fiber. Two common methods for optically coupling discrete optical elements include physical contact coupling and expanded beam (EB) coupling. When coupling separate optical fibers through physical contact, a ferrule is attached to the end of each optical fiber. The ferrule includes an optical path that extends from the core of the optical fiber to a polished face of the ferrule. Both ferrules are inserted into a common sleeve that aligns the ferrules. The polished faces of the ferrules abut each other within the common sleeve thereby optically coupling the optical fibers. As such, physical contact coupling may also be referred to as butt coupling.

In EB coupling, the mode field diameter of the propagating light is expanded before traveling between the optical fiber and the other optical element. For example, an EB connector may include a lens structure (e.g., ball lens or molded lens) that has a fixed position relative to the end of the optical fiber. In some applications, two EB connectors optically couple to each other. The lens structure of a first EB connector receives light from an optical fiber and expands and collimates the light. This collimated light travels across a gap and is received by the lens structure of a second EB connector. The gap between the lens structures may include empty space or a material having predetermined optical properties. The lens structure of the second EB connector converges the light into another optical fiber to which the second EB connector is connected.

Both types of coupling (physical contact and EB) may perform sufficiently for some applications, but each has its drawbacks or challenges in implementation. Optical fibers that are coupled through physical contact may become misaligned and/or damaged when exposed to vibrations and/or substantial changes in temperature. More specifically, the material of the ferrules or sleeve may expand or contract causing the optical fibers to become misaligned. For applications that have a relatively small mode field diameter, such as the mode field diameters in single mode fibers, any dust that exists between the polished faces of the ferrules can scratch or damage the polished faces and/or block light through the optical interface resulting in a decrease in performance.

Although the EB connectors may be used with smaller optical fibers (e.g., single mode fibers) and in harsher environments, the technology can be relatively expensive. For instance, known EB connectors utilize ball lenses that have relatively small diameters (e.g., 1.0 mm, 0.1 mm, or smaller). It can be difficult and costly to manufacture, polish, and accurately position the ball lens in front of the fiber end. Other EB connectors utilize a molded lens. These lenses, however, can also be expensive to manufacture. In some cases, the molded lenses may not be suitable for harsher environments, such as those experienced in military applications.

Accordingly, there is a need for an EB connector that is less costly and/or capable of being used in harsher environments than known EB connectors.

BRIEF DESCRIPTION

In an embodiment, an expanded beam (EB) connector is provided that includes a fiber holder having an alignment channel that is configured to receive an optical fiber. The alignment channel has a channel opening and extends from the channel opening to a channel end face. The EB connector also includes an optical substrate having the channel end face. The optical substrate forms a three-dimensional (3D) waveguide that includes a waveguide core and a cladding that surrounds the waveguide core. Each of the cladding and the waveguide core are portions of the optical substrate. The waveguide core is locally modified to have a refractive index that is greater than a refractive index of the cladding. The waveguide core extends lengthwise between first and second coupling faces. The first coupling face is aligned with the channel end face and is configured to optically couple to the optical fiber disposed within the alignment channel. The second coupling face defines an exterior of the optical substrate. The second coupling face has an area that is greater than an area of the first coupling face and a numerical aperture that is less than a numerical aperture of the first coupling face. The waveguide core is shaped to change a mode field diameter of light propagating between the first and second coupling faces.

In an embodiment, an optical cable assembly is provided that includes an optical cable having a bundle of optical fibers. Each optical fiber has a respective end segment. The optical cable assembly also includes a ferrule body having a plurality of alignment channels and a plurality of 3D waveguides. Each of the alignment channels has the end segment of a corresponding optical fiber disposed therein. Each of the 3D waveguides of the plurality of 3D waveguides is aligned with a corresponding alignment channel. Each of the 3D waveguides includes a waveguide core and a cladding that surrounds the waveguide core. The waveguide core extends lengthwise between first and second coupling faces of the waveguide core. The first coupling face is aligned with the alignment channel and is configured to optically couple to the optical fiber disposed within the alignment channel. The second coupling face defines an exterior of the waveguide core. The second coupling face has an area that is greater than the first coupling face and a numerical aperture that is less than a numerical aperture of the first coupling face. The waveguide core is shaped to change a mode field diameter of light propagating between the first and second coupling faces.

In an embodiment, a method is provided that includes providing a substrate layer including a substrate material and providing focused light energy at a designated focal region within the substrate layer. The method also includes moving the focal region through the optical substrate along a plurality of separate channel regions of the optical substrate. The light energy at the focal region is controlled to increase the etching rate of the substrate material along the channel regions. The method also includes moving the focal region through the optical substrate along a plurality of separate core regions. The light energy at the focal region is controlled to increase the refractive indexes of the substrate material along the core regions. The core regions form waveguide cores that are surrounded by the substrate material. The refractive index of the substrate material that surrounds the waveguide cores is less than the refractive indexes of the waveguide cores. Each of the waveguide cores is shaped to change a mode field diameter of light propagating between the first and second coupling faces and to change a numerical aperture of the second coupling face. The waveguide cores are aligned with the alignment channels.

DETAILED DESCRIPTION

Figure 1:
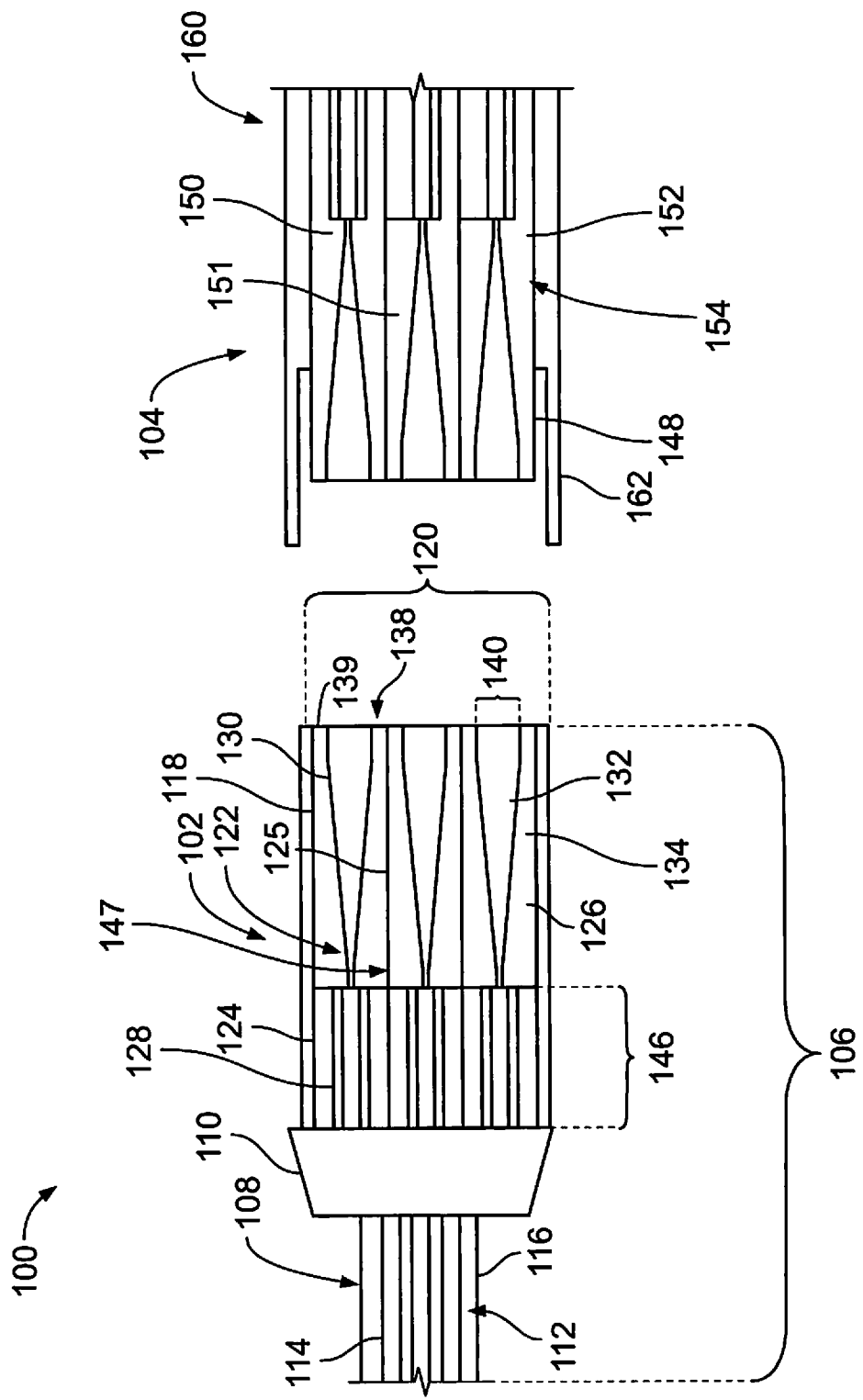
FIG. 1 is a side schematic illustration of an optical system that includes a plurality of EB connectors formed in accordance with an embodiment.

Embodiments set forth herein include expanded beam (EB) connectors and systems and devices including the same, such as optical connectors, cable assemblies, and communication devices. The EB connectors are configured to generate or receive an expanded beam. Depending on the direction of propagating light, the EB connector may expand the beam or converge the light thereby changing the mode field diameter and numerical aperture of the waveguide. The mode field diameter characterizes the distribution of optical energy per unit area across an end face of an optical fiber, and the numerical aperture characterizes the amount of beam spreading of the mode as it propagates from the end face or characterizes the range of angles at which the end face can receive light.

As described herein, the EB connectors include three-dimensional (3D) waveguides that are formed within an optical substrate for changing the mode field diameter and numerical aperture of the light. As used herein, a "3D waveguide" includes a waveguide core that is surrounded by a waveguide cladding, wherein the waveguide core has varying dimensions. For example, the waveguide core may extend along a linear or non-linear path and have a cross-sectional area taken transverse to the direction of the path (or direction of the propagating light). The cross-sectional area may increase or decrease in size in order to expand or converge, respectively, a mode field diameter of the propagating light and/or reduce or increase, respectively, the numerical aperture of the 3D waveguide. In some embodiments, a localized region or portion of the optical substrate is modified (e.g., using a femtosecond laser) such that the localized portion has a higher refractive index than a region or portion of the optical substrate that surrounds the localized region. The localized region forms a core of the 3D waveguide and the surrounding region forms a cladding of the 3D waveguide. Both the core and at least a region of the cladding may be formed from the same body of material (e.g., glass). In particular embodiments, the core has a varying or non-uniform refractive index. For example, the contrast (or delta) between the refractive indexes of the core and the cladding may change as the 3D waveguide extends from one end to another end. In other embodiments, the core may have a uniform (e.g., unchanging) refractive index.

In some embodiments, the body of material is etched to form an alignment channel for aligning an optical fiber with the 3D waveguide. As such, the same body of material (referred to as a monolithic body) may be used to form a 3D waveguide and the alignment channel that holds the optical fiber. The optical fiber may be secured to the monolithic body using, for example, an adhesive. In other embodiments, however, the alignment channel may be formed from a different material and the alignment channel and 3D waveguide may be coupled to each other. As such, embodiments set forth herein may be less costly and/or used in harsher environments than known apparatuses that utilize EB technology.

As used herein, phrases such as "a plurality of [elements]," "a set of [elements]," "an array of [elements]," and the like, when used in the detailed description and claims, do not necessarily include each and every element that a component may have. For instance, the phrase "the optical connector having a plurality of 3D waveguides that include [a recited feature]" does not necessarily mean that each and every 3D waveguide of the optical connector has the recited feature. Instead, only a plurality of the 3D waveguides may have the recited feature and other 3D waveguides of the optical connector may not include the recited feature. As another example, the detailed description or the claims may recite that an optical connector includes "a plurality of 3D waveguides, each of which including a [recited feature]." This phrase does not exclude the possibility that other 3D waveguides of the optical connector may not have the recited feature. Accordingly, unless explicitly stated otherwise (e.g., "each and every 3D waveguide of the optical connector"), embodiments may include similar elements that do not have the same features.

FIG. 1 is a side schematic illustration of an optical system 100 that includes a first optical connector 102 and a second optical connector 104 that are configured to operably engage each other for communicating optical signals therebetween. In the illustrated embodiment, the first optical connector 102 forms a portion of an optical cable assembly 106 and the second optical connector 104 forms a portion of a communication device 160. In some embodiments, the optical system 100 includes the optical cable assembly 106 and the communication device 160.

The optical cable assembly 106 includes the first optical connector 102 and an optical cable 108 that is coupled to the first optical connector 102 through a cable boot 110. The optical cable 108 includes a bundle 112 of optical fibers 114 that are optionally surrounded by a common jacket 116. Each of the optical fibers 114 may include a core and one or more surrounding layers. Although the optical cable 108 is shown with the bundle 112 of optical fibers 114, other embodiments may include only a single optical fiber. In some embodiments, the optical cable assembly 106 includes another optical connector at an opposite end of the optical cable 108. The other optical connector may be similar or identical to the first optical connector 102.

The first optical connector 102 includes a ferrule body 118 that holds a set 120 of EB connectors 122. In particular embodiments, the ferrule body 118 includes a plurality of discrete substrate layers 124, 125, 126 that are stacked side-by-side to form the ferrule body 118. Each substrate layer 124-126 may include a plurality of the EB connectors 122. For example, the EB connectors 122 of a single substrate layer may be positioned side-by-side into or out of the page in FIG. 1. Each of the EB connectors 122 may include an alignment channel 128 and a 3D waveguide 130 that is positioned adjacent to the alignment channel 128. The 3D waveguide 130 includes a waveguide core 132 and a cladding 134 that surrounds the waveguide core 132. The waveguide core 132 and the cladding 134 have respective indexes of refraction that enable the beam propagation guidance of light by the 3D waveguide. Depending on the direction of propagating light, the 3D waveguide 130 is configured to expand or converge a mode field diameter of the propagating light and reduce or increase the numerical aperture of the 3D waveguide. The EB connectors 122 may be similar or identical to the EB connectors 200 (shown in FIG. 2).

The ferrule body 118 has a mating end 138 that is configured to align with and engage the second optical connector 104. The substrate layers 124-126 include respective layer edges 139 that collectively form the mating end 138. Each of the waveguide cores 132 has a coupling face 140 at one of the layer edges 139 that forms a portion of the mating end 138. The coupling faces 140 may form an EB array of the coupling faces 140 that aligns with an EB array of the second optical connector 104.

The alignment channels 128 are sized and shaped to receive corresponding end segments 146 of the optical fibers 114. Each alignment channel 128 may be sized and shaped to receive an end segment 146 from only a single optical fiber 114. Various types of optical fibers may be used. In particular embodiments, the optical fibers 114 are single mode fibers. In some embodiments, a core of the single mode fiber may have a diameter that is at most 11 micrometers (μm). For example, the diameter of a single mode fiber may be between 7 μm and 11 μm. In other embodiments, the core diameter of the single mode fiber may be greater than 11 μm. In other embodiments, the optical fibers 114 may be multi-mode fibers having larger core diameters.

In some embodiments, the alignment channel 128 may extend along and open toward a top side 147 of the corresponding substrate layer. In such instances, the alignment channel 128 may be referred to as an open-sided alignment channel. The alignment channels 128 of the substrate layers 125, 126 are open-sided channels. When the ferrule body 118 is fully constructed, the adjacent substrate layers may cover the open-sided channels. The alignment channel 128 of the substrate layer 124 is not open-sided. Instead, the substrate layer 124 encloses the corresponding alignment channel 128, except for an opening that is configured to receive the end segment 146 of the optical fiber 114.

The second optical connector 104 may be similar or identical to the first optical connector 102. For example, the second optical connector 104 may include a ferrule body 148 having a plurality of substrate layers 150, 151, 152 in which each of the substrate layers 150-152 has one or more EB connectors 154. The EB connectors 154 may be similar or identical to the EB connectors 122. However, other embodiments may include other types of EB connectors.

The second optical connector 104 is disposed within a housing 162 of the communication device 160. Only a portion of the communication device 160 is shown in FIG. 1. The communication device 160 and/or the second optical connector 104 may be used for a variety of applications. For example, the communication device 160 may be a smart phone, an electronic reader (e-reader), or other handheld consumer device. In some embodiments, the second optical connector 104 may constitute or be a part of an optical engine that is configured to receive and transform optical signals into electrical signals and/or vice versa. In some embodiments, the communication device 160 is a pluggable input/output (I/O) module. At least a portion of the pluggable I/O module may be configured to be compliant with certain industry standards, such as, but not limited to, the small-form factor pluggable (SFP) standard, enhanced SFP (SFP+) standard, quad SFP (QSFP) standard, C form-factor pluggable (CFP) standard, and 10 Gigabit SFP standard, which is often referred to as the XFP standard. In other embodiments, the communication device 160 includes a photonic integrated circuit (PIC) that is used for communicating and/or processing optical signals. Other non-limiting examples of applications for the communication device 160 and/or the second optical connector 104 include optical switches, couplers, routers, splitters, modulators, amplifiers, multiplexers/demultiplexers, and wavelength converters. In an alternative embodiment, the communication device 160 is another optical cable assembly that is configured to mate with the optical cable assembly 106.

In some embodiments, at least a portion of the first optical connector 102 and/or the second optical connector 104 is fabricated with processes that are similar to those used to manufacture semiconductors. For example, the first optical connector 102 may be manufactured using processes that produce microelectromechanical systems (MEMs) devices, complementary metal-oxide-semiconductor (CMOS) devices, and/or silicon-on-insulator (SOI) devices. More specifically, the first optical connector 102 may be manufactured by growing, depositing, etching, lithographically processing, or otherwise modifying a plurality of a stacked substrate layers.

Figure 2:
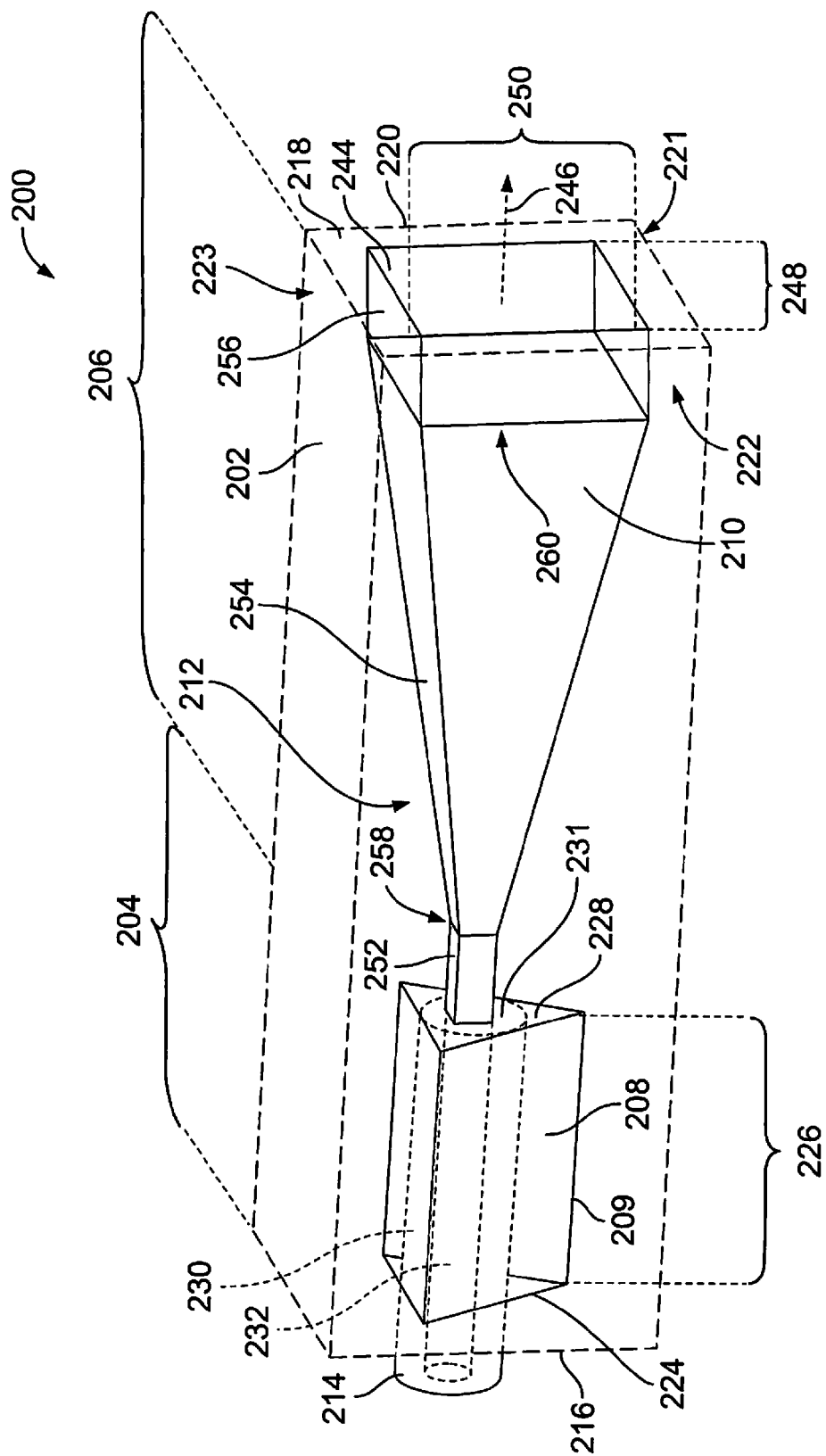
FIG. 2 is an isolated perspective view of an EB connector formed in accordance with an embodiment.

FIG. 2 is an isolated perspective view of an exemplary EB connector 200 in accordance with a specific embodiment. The EB connector 200 may be manufactured using, for example, a method that is similar to the method 300 (shown in FIG. 5). The EB connector 200 includes an optical substrate 202. In the illustrated embodiment, the optical substrate 202 forms a fiber holder 204 and a 3D waveguide 206. In some embodiments, the fiber holder 204 and the 3D waveguide 206 are part of the same body of material, which is the optical substrate 202. In other embodiments, however, the fiber holder 204 may be a separate or discrete element that is coupled to the 3D waveguide 206 or, more specifically, that is directly coupled to the optical substrate 202. For embodiments in which the fiber holder 204 and the 3D waveguide 206 are part of the same monolithic body, the fiber holder 204 may be referred to as a fiber holder section and the 3D waveguide 206 may be referred to as a waveguide section. The optical substrate 202 may constitute the monolithic body.

The fiber holder 204 includes an alignment channel 208 and the 3D waveguide 206 includes a waveguide core 210 and a cladding 212. As described herein, the waveguide core 210 and the cladding 212 are portions of the optical substrate 202. The waveguide core 210 and the cladding 212 may be formed from a common material (e.g., the optical substrate 202) that has been modified to have different refractive indexes. The waveguide core 210 and the cladding 212 may have the same chemical composition. The alignment channel 208 is a space or void within the optical substrate 202 that is defined by interior surfaces of the optical substrate 202 that intersect each other at edges 209. The waveguide core 210 is a portion of the optical substrate 202 that has been modified to have a different refractive index than the refractive index of the surrounding portion of the optical substrate 202, which is referred to as the cladding 212. In particular embodiments, the refractive index of the waveguide core 210 is non-uniform as the waveguide core 210 extends between its opposite ends such that the difference between the refractive index of the waveguide core 210 and the refractive index of the cladding 212 changes. This difference between the refractive index of the waveguide core 210 and the refractive index of the cladding 212 may be referred to as delta or refractive index contrast. For illustrative purposes, the waveguide core 210 and the edges 209 of the alignment channel 208 are shown as solid lines in FIG. 2. The exterior of the optical substrate 202 and a portion of an optical fiber 214 within the alignment channel 208 are defined by dashed lines.

The optical substrate 202 includes a receiving or input side 216 and an operative side 218. The receiving side 216 represents a side of the optical substrate 202 through which the optical fiber 214 is inserted into the alignment channel 208. The operative side 218 represents a side of the optical substrate 202 that the optical signals will propagate through in an expanded state. As shown, the receiving side 216 and the operative side 218 face in opposite directions. It is contemplated, however, that the waveguide core 210 may have a non-linear shape in other embodiments and, as such, the operative side 218 may not be positioned opposite the receiving side 216. For example, the waveguide core 210 may have one or more curves. The curvature of these may be sufficient for allowing the propagation of light.

The optical substrate 202 also includes a plurality of side walls 220-223 that extend between and join the operative side 218 and the receiving side 216. In the illustrated embodiment, the receiving side 216, the operative side 218, and the side walls 220-223 are planar and an exterior of the EB connector 200 is shaped as a parallelepiped or polyhedron. In other embodiments, one or more of the receiving side 216, the operative side 218, and the side walls 220-223 may be non-planar. Such embodiments may be suitable for applications in which the sides are used as reference surfaces for locating the optical substrate at a designated position.

The receiving side 216 includes a channel opening 224 to the alignment channel 208. In alternative embodiments in which the fiber holder 204 is a discrete component with respect to the 3D waveguide 206, the receiving side 216 may not be part of the optical substrate 202. The alignment channel 208 extends a depth 226 from the channel opening 224 at the receiving side 216 to a channel end face 228. The alignment channel 208 is sized and shaped to receive and hold an end segment 230 of an optical fiber 214 such that a fiber core 232 of the optical fiber 214 is aligned with the waveguide core 210. The end segment 230 represents the length of the optical fiber that is received within the alignment channel 208. In some embodiments, the length may be essentially equal to the depth 226 of the alignment channel 208. The end segment 230 has a terminating face 231 that is configured to face or abut the channel end face 228. Optionally, a light-transmitting adhesive (e.g., epoxy), anti-reflective coating, or other optically suitable material may exist between the terminating face 231 and the channel end face 228.

Figure 3:
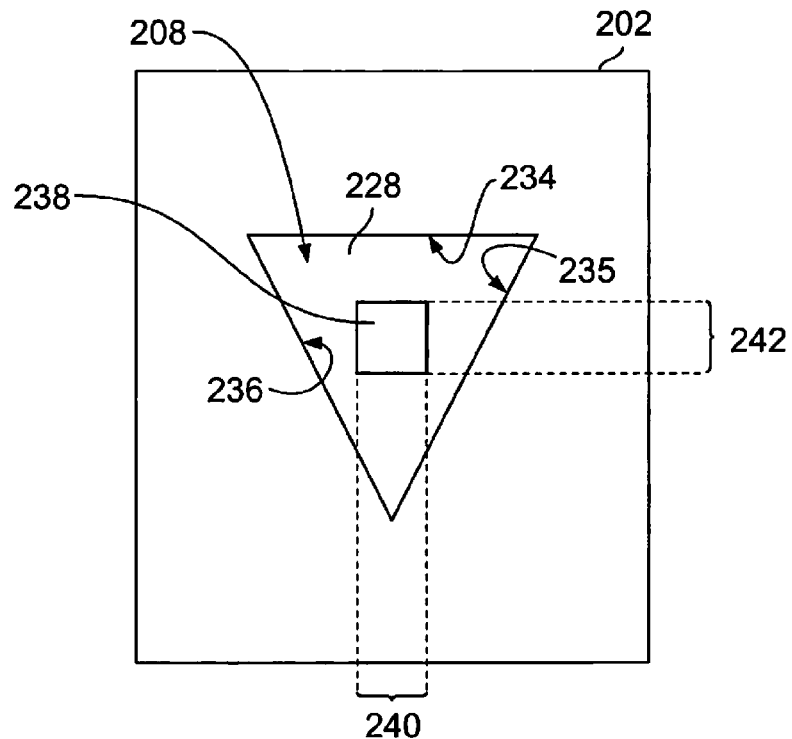
FIG. 3 is an end view of the EB connector of FIG. 2 prior to an optical fiber being inserted into an alignment channel of the EB connector.

For example, FIG. 3 illustrates an end view of the optical substrate 202 including the alignment channel 208 prior to the end segment 230 (FIG. 2) of the optical fiber 214 (FIG. 2) being disposed in the alignment channel 208. The alignment channel 208 is defined by a plurality of interior channel surfaces 234-236 and the channel end face 228. The optical substrate 202 includes the channel end face 228. The channel end face 228 is configured to be aligned with a first coupling face of the waveguide core so that light may be directed into the waveguide core. For example, as shown, the channel end face 228 within the alignment channel 208 may include a first coupling face 238 of the waveguide core 210. In other words, the first coupling face 238 may form at least a portion of the channel end face 228. In other embodiments, the first coupling face 238 may be positioned within the optical substrate 202 immediately adjacent to the end face 228. In either case, the first coupling face is "aligned with" the channel end face. The first coupling face 238 is configured to optically couple to the optical fiber 214 disposed within the alignment channel 208. In the illustrated embodiment, the first coupling face 238 is substantially square-shaped having first and second perpendicular dimensions 240, 242 that are substantially equal. In other embodiments, however, the first coupling face 238 may have different shapes (e.g., circle, rectangle, etc.). The first coupling face 238 has a shape that is sufficient for coupling with the fiber core 232 (FIG. 2) of the optical fiber 214.

Figure 4:
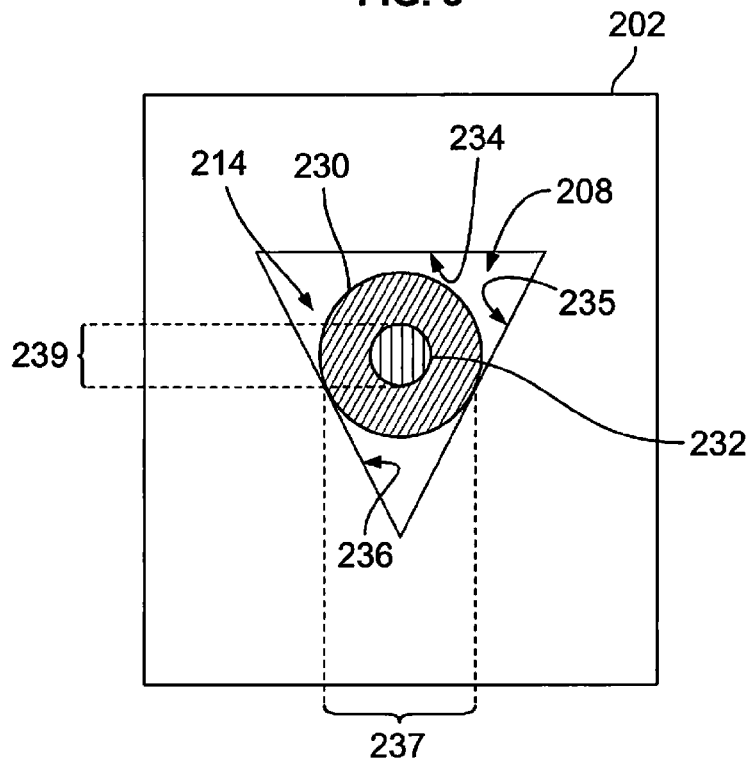
FIG. 4 is an end view of the EB connector of FIG. 2 after the optical fiber has been inserted into the alignment channel.

FIG. 4 illustrates the end view of the optical substrate 202 after the end segment 230 of the optical fiber 214 has been disposed within the alignment channel 208. As described herein, the channel surfaces 234-236 may be formed by etching the optical substrate 202 to remove material therefrom. As such, the channels surfaces may be referred to as etched channel surfaces. The channel surfaces 234-236 are positioned to hold the end segment 230 of the optical fiber 214 at a designated position such that the fiber core 232 is aligned with the first coupling face 238 (FIG. 3) of the waveguide core 210 (FIG. 2). As such, the positions, shapes, and sizes of the channel surfaces 234-236 are based on an outer diameter 237 of the optical fiber 214 and the core diameter 239 of the fiber core 232. In particular, the channel surfaces 235, 236 form a V-shape such that each of the channel surfaces 235, 236 engages the optical fiber 214, but a gap exists between the channel surface 234 and the optical fiber 214. In other embodiments, any two of the channel surfaces 234-236 or each of the channel surfaces 234-236 engages the optical fiber 214.

The channel surfaces 234-236 collectively form a triangular shape. In other embodiments, however, the channel surfaces 234-236 may collectively form other shapes (e.g., square, rectangle, or other polygon). The channel surfaces 234-236 may also form other shapes that include non-planar sides. For example, at least one of the channel surfaces may have a radius of curvature that matches the radius of curvature of the outer surface of the optical fiber 214. Although not shown, an adhesive material may be injected into any open spaces or voids within the alignment channel 208 before or after the optical fiber 214 is operably positioned. The adhesive material may then be activated or permitted to cure such that the optical fiber 214 is secured to the channel surfaces 234-236 of the optical substrate 202.

Returning to FIG. 2, the waveguide core 210 extends lengthwise between the first coupling face 238 (FIG. 3) and a second coupling face 244. More specifically, the first coupling face 238 faces the alignment channel 208 and is configured to face and, optionally, physically contact or abut the terminating face 231 of the optical fiber 214. The second coupling face 244 defines a portion of the outer side 218 and a portion of the exterior of the waveguide core 210 and the optical substrate 202. The second coupling face 244 is configured to face another optical element for transmitting light therebetween.

Depending on the direction in which the light is propagating, the first and second coupling faces 238, 244 may be referred to as an input face or an output face. For example, the first coupling face 238 may receive light from the fiber core 232 of the optical fiber 214 that propagates through the waveguide core 210 to the second coupling face 244. Alternatively, the second coupling face 244 may receive light from another optical element, such as another EB connector, that propagates through the waveguide core 210 to the first coupling face 238 and into the fiber core 232. The light generally travels along a light-propagating axis 246 that extends along a geometric center of the waveguide core 210. The light-propagating axis 246 is linear in the illustrated embodiment, but may be non-linear in other embodiments. In some embodiments, the light-propagating axis 246 exits the second coupling face 244 at an angle that is perpendicular to the second coupling face 244. In other embodiments, the light-propagating axis 246 exits the second coupling face 244 at a non-orthogonal angle, such as 10° or less with respect to an axis that is perpendicular to the second coupling face 244.

As shown, the second coupling face 244 has a first dimension 248 and a second dimension 250 that are nearly equal such that the second coupling face 244 is rectangular. In other embodiments, the first and second dimensions 248, 250 may be essentially equal such that the second coupling face 244 is square-shaped. The first and second dimensions 248, 250 of the second coupling face 244 are greater than the first and second dimensions 240, 242 (FIG. 3) of the first coupling face 238. As such, an area of the second coupling face 244 is greater than an area of the first coupling face 238. The second coupling face 244 may have an area that is, for example, at least ten times (10×), twenty times (20×), fifty times (50×), or a hundred times (100×) the area of the first coupling face 238. By way of example, the first coupling face 238 may have an area of about $1.0 \times 10^{-10}$ square meters ($m^2$) and the second coupling face 244 may have an area of about $25.0 \times 10^{-10}$ $m^2$. The second coupling face 244 may also have a numerical aperture that is less than the numerical aperture of the first coupling face 238. In some embodiments, the 3D waveguide 206 sufficiently collimates the light such that the light is capable of traversing to the next optical element (e.g., another EB connector) without a substantial reduction in power. The light exiting the second coupling face 244 may be more collimated than the light received at the first coupling face 238.

The 3D waveguide 206 is configured to change a mode field diameter of the light by expanding or converging the light. To this end, the waveguide core 210 includes a plurality of different segments that have different cross-sectional areas or profiles. In the illustrated embodiment, the waveguide core 210 includes a first coupling segment 252, a mode-converting segment 254, and a second coupling segment 256. The mode-converting segment 254 extends between and joins the first and second coupling segments 252, 256. In other embodiments, the waveguide core 210 may not include the second coupling segment 256 and/or the first coupling segment 252. In other embodiments, the waveguide core 210 may include more segments than those shown in FIG. 2.

The first coupling segment 252 has a uniform cross-sectional area as the first coupling segment 252 extends from the first coupling face 238 (FIG. 3) to an intersection or joint 258 between the first coupling segment 252 and the mode-converting segment 254. The second coupling segment 256 has a uniform cross-sectional area as the second coupling segment 256 extends from the second coupling face 244 to an intersection or joint 260 between the second coupling segment 256 and the mode-converting segment 254. The second coupling segment 256 may have a length that permits sufficient collimation of the light.

The mode-converting segment 254 extends between the intersections 258, 260. The mode-converting segment 254 has a cross-sectional profile taken transverse to the propagation of light (or the light-propagating axis 246) that changes as the mode-converting segment 254 extends between the intersections 258, 260. In the illustrated embodiment, the cross-sectional profile changes in a linear manner. For example, an area of the cross-sectional profile increases at a linear rate as the mode-converting segment 254 extends from the first coupling segment 252 toward the second coupling segment 256 (or from the intersection 258 to the intersection 260). It is contemplated, however, that the cross-sectional profile may change at a non-linear rate in other embodiments. For example, the mode-converting segment 254 may have a plurality of sub-segments in which each sub-segment has a cross-sectional profile that changes at a different rate with respect to other sub-segments.

In the illustrated embodiment, the light-propagating axis 246 is perpendicular to the first coupling face 238 and the second coupling face 244. In other embodiments, however, the light-propagating axis 246 may not be perpendicular to the first coupling face 238 and/or the second coupling face 244. Such embodiment may be used to reduce reflections of the optical signals.

Figure 5:
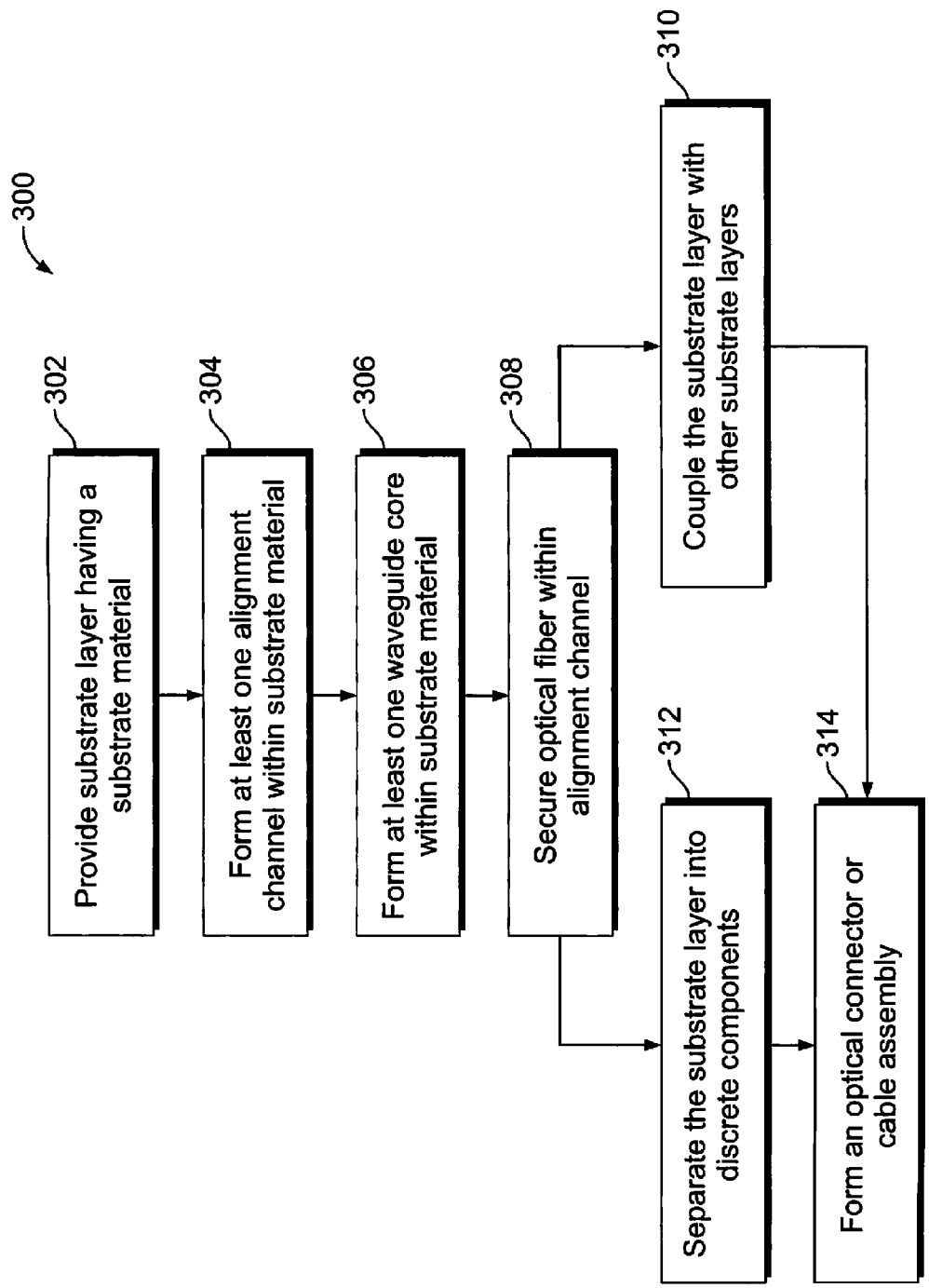
FIG. 5 is a flow chart illustrating a method in accordance with an embodiment.
Figure 6:
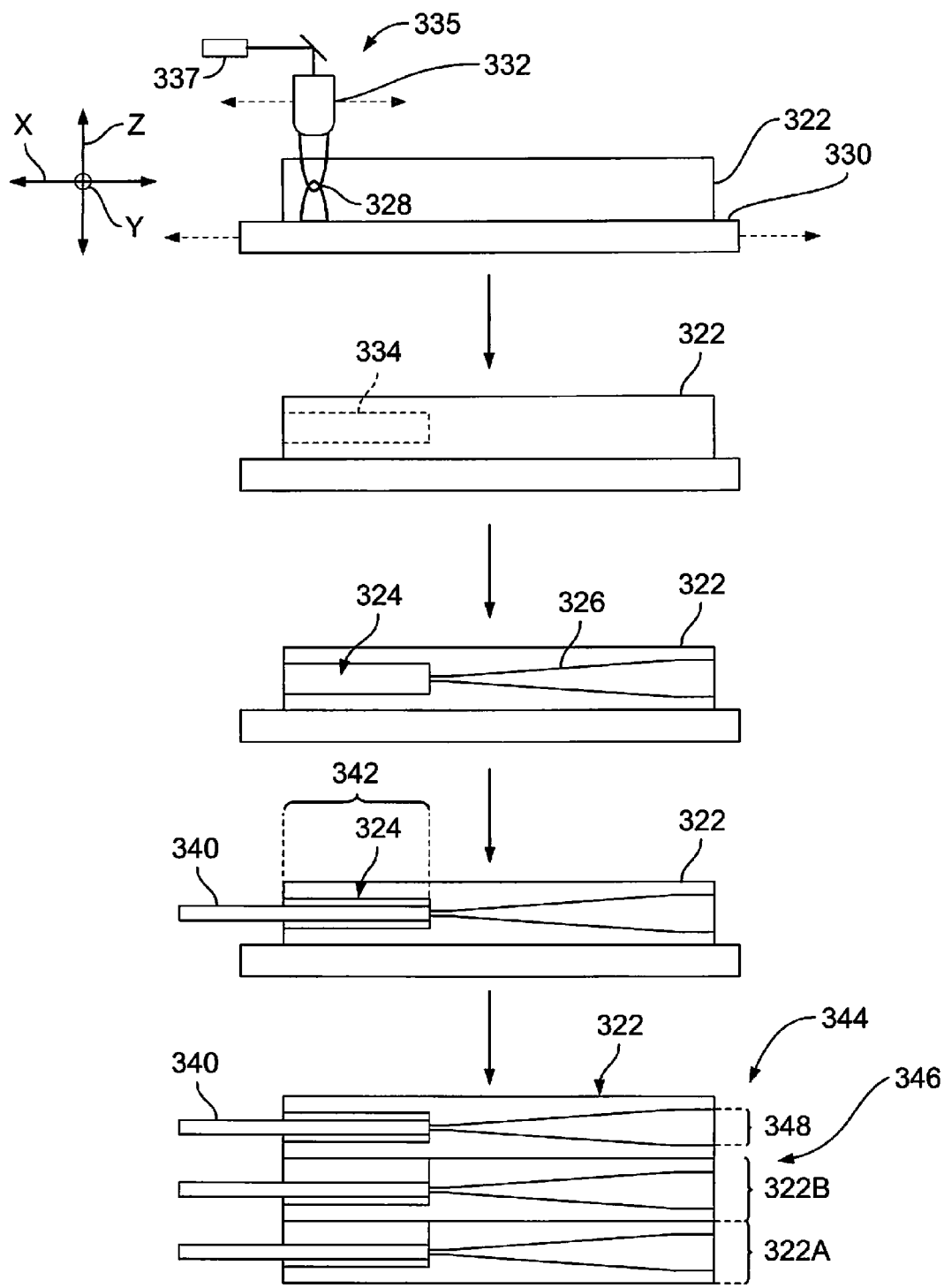
FIG. 6 illustrates different stages of the method of FIG. 5.

FIG. 5 is a flow chart illustrating a method 300 in accordance with an embodiment. The method 300 may include one or more steps or processes that are also used to manufacture a single EB connector, a plurality of EB connectors, an optical connector, an optical cable assembly, or a communication device. Accordingly, in some embodiments, the method 300 may be a method of manufacturing an EB connector, an optical connector, an optical cable assembly, or a communication device. The EB connector may be similar or identical to, for example, the EB connector 122 (FIG. 1) or the EB connector 200 (FIG. 2). The method 300 is described with reference to FIG. 6, which illustrates different stages of the method 300 in accordance with one embodiment. It is noted that the stages shown in FIG. 6 are for illustrative purposes only and do not necessarily correlate to the operations of the method 300.

The method 300 may employ structures or aspects of various embodiments described herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 300 may include a plurality of additive or subtractive steps in which portions of a working layer are added or subtracted, respectively. The terms "working layer" and "working body" are used to describe intermediate objects that are used to form an EB connector or a ferrule body or other end product. The term "working body" includes a plurality of stacked substrate layers in which at least one of the substrate layers includes an EB connector or includes a plurality of EB connectors that are coupled to a common housing.

At least one of the substrate layers may be formed using one or more processes that are similar to, for example, the processes used to manufacture integrated circuits, semiconductors, and/or MEMS. For example, lithography (e.g., photolithography) is one category of techniques or processes that may be used to fabricate embodiments described herein.

One or more processes for fabricating the substrate layers and/or the EB connectors may include subtractive techniques in which material is removed from a working substrate. In addition to lithography, such processes include (1) chemical techniques, such as dry chemical etching, reactive ion etching (RIE), vapor phase etching, chemical machining (CM), anisotropic wet chemical etching, wet photoetching; (2) electrochemical techniques, such as electrochemical etching (ECM), electrochemical grinding (ECG), photoelectrochemical etching; (3) thermal techniques, such as laser machining, electron beam machining, electrical discharge machining (EDM); and (4) mechanical techniques, such as physical dry etching, sputter etching, ion milling, water-jet machining (WJM), abrasive water-jet machining (AWJM), abrasive jet machining (AJM), abrasive grinding, electrolytic in-process dressing (ELID) grinding, ultrasonic drilling, focused ion beam (FIB) milling, and the like. The above list is not intended to be limiting and other subtractive techniques or processes may be used.

One or more processes for fabricating the substrate layers and/or the EB connectors may also include additive techniques in which material is added to a working substrate. Such processes include plasma vapor deposition (PVD), evaporation (e.g., thermal evaporation), sputtering, ion plating, ion cluster beam deposition, pulsed laser deposition, laser ablation deposition, molecular beam epitaxy, chemical vapor deposition (CVD) (e.g., atmospheric pressure CVD (APCVD), low pressure CVD (LPCVD), very low pressure CVD (VLPCVD), ultrahigh vacuum CVD (UHVCVD), metalorganic CVD (MOCVD), laser-assisted chemical vapor deposition (LACVD), plasma-enhanced CVD (PECVD), atomic layer deposition (ALD), epitaxy (e.g., liquid-phase epitaxy, solid-phase epitaxy), anodization, thermal spray deposition, electroplating, electroless plating, incorporation in the melt, thermal oxidation, laser sputter deposition, reaction injection molding (RIM), spin coating, polymer spraying, polymer dry film lamination, casting, plasma polymerization, silk screen printing, ink jet printing, mechanical microspotting, microcontact printing, stereolithography or microphotoforming, nanoimprint lithography, electrochemical forming processes, electrodeposition, spray pyrolysis, electron beam deposition, plasma spray deposition, micromolding, LIGA (which is a German acronym for x-ray lithography, electrodeposition, and molding), compression molding, and the like. The above list is not intended to be limiting and other additive techniques or processes may be used.

One or more processes may provide embodiments with identifiable physical characteristics. For example, channels formed within optical substrates may be identified as etched channels or molded channels based upon inspection of the EB connector or ferrule body. More specifically, a scanning electron microscope (SEM) or other imaging system may capture an image of the optical substrate, such as a sliced portion of the optical substrate. The channels may have qualities or characteristics that are indicative of surfaces that are etched or molded. Other features may have physical characteristics that are caused by a designated process.

The method 300 includes providing, at 302 (FIG. 5), a substrate layer 322 (FIG. 6), which may also be referred to as a working layer. As shown in FIG. 6, the substrate layer 322 is supported by a stage 330 that is positioned proximate to an objective lens 332 of a light source assembly 335. The light source assembly 335 includes a light source (e.g., laser) 337 that is optically coupled to the objective lens 332. The substrate layer 322 comprises a substrate material or bulk material. The substrate material may be any material that permits light energy (e.g., light from a laser) to be directed into the substrate material and toward a focal region within the substrate layer 322. The light energy is configured to modify the substrate material at the focal region for a designated purpose. For example, the substrate material may be modified to increase the etching rate of the substrate material. The substrate material may also be modified to increase the refractive index along designated regions. In some embodiments, the substrate material may comprise silica glass, such as fused silica or other types of glass, such as borosilicate glass.

The method 300 also includes forming, at 304, an alignment channel 324 within the substrate layer 322 and forming, at 306, a waveguide core 326 that is aligned with the alignment channel 324. In particular embodiments, the forming operations 304, 306 are performed in a similar manner and/or are performed concurrently. For example, each of the operations 304, 306 may include providing light energy at a designated focal region 328 within the substrate layer 322. As shown in FIG. 6, the substrate layer 322 is positioned between the stage 330 and the objective lens 332. The objective lens 332 is configured to focus the light energy at the designated focal region 328 within the substrate layer 322. As the light energy is applied to the focal region 328, the stage 330 and/or the objective lens 332 may be moved such that the focal region 328 moves through a channel region 334 of the substrate layer 322. In FIG. 6, the stage 330 and/or the objective lens 332 are indicated as being movable side-to-side along an X-axis. It should be understood, however, that the stage 330 and/or the objective lens 332 may also be movable along a Z-axis and/or along a Y-axis in some embodiments.

Without subscribing to a particular theory or mechanism, it is believed that when the substrate layer 322 is irradiated along the channel region 334, the light energy (e.g., femtosecond laser pulses) causes chemical bonds (e.g., Si—O bonds) to break and/or the formation of new chemical bonds with different structures. These changes effectively increase the etching rate of the irradiated channel region 334 without significantly changing the etching rate of the material that surrounds the channel region 334. (See, e.g., Zhao, Mengjiao, Jie Hu, Lan Jiang, Kaihu Zhang, Pengjun Liu, and Yongfeng Lu. "Controllable high-throughput high-quality femtosecond laser-enhanced chemical etching by temporal pulse shaping based on electron density control." Scientific reports 5 (2015).) Thus, although the substrate material may include a common or uniform chemical composition, one or more portions of the substrate material may be modified by the light energy while other portions are not modified by the light energy. The portions modified by the light energy are "locally modified" because other nearby portions are not modified by the light energy. The portions that are locally modified may be referred to as localized regions.

Before, after, or during irradiation of the channel regions 334, the substrate layer may also be irradiated to form reference surfaces. As used herein, a reference surface may be any surface of an optical substrate that has a predetermined position relative to one or more waveguide cores and/or one or more alignment channels. The reference surfaces may facilitate assembly the final end product and/or may facilitate mating with another component. Exemplary reference surfaces are described below with respect to FIGS. 7, 9, and 10.

In some embodiments, movement of the stage 330 and/or the objective lens 332 may be pre-programmed to generate a plurality of separate channel regions 334 at designated locations within the substrate layer 322. For example, a system may include a processor that is configured to execute programmed instructions stored in memory. The programmed instructions may control operation of a motor (e.g., piezoelectric motor) for moving the stage 330 and/or the objective lens 332 such that the focal region 328 moves within the substrate layer 322. The processor may also control operation of the light source assembly (e.g., laser) 335. In such embodiments, a plurality of EB connectors for a single optical connector or multiple optical connectors may be formed within the substrate layer. Accordingly, the method 300 may include, in some embodiments, moving the focal region 328 through the substrate layer 322 along a plurality of separate channel regions 334 of the substrate layer 322. The light energy at the focal region 328 may be controlled to increase the etching rate of the substrate material along the channel regions 334.

The forming operation, at 304, may also include exposing the substrate layer 322 to an etchant, such as hydrofluoric acid (HF) or potassium hydroxide (KOH). The etchant etches the channel region 334 at a greater rate than the surrounding region. After a designated period of time, the substrate material along the channel region 334 is removed and the alignment channel 324 is formed within the substrate layer 322.

The forming operation, at 306, may also include modifying the substrate material of the substrate layer 322 using the focused light energy. For example, in a similar manner as described above, the light energy is directed to the focal region 328 of the objective lens 332 within the substrate layer 322. However, the light energy may be controlled such that the light energy does not cause an increase in the etching rate of the substrate material. Instead, the light energy increases the refractive index of the substrate material.

More specifically, the forming operation, at 306, may include moving the focal region 328 through the substrate layer 322 along separate core regions 326. Each of the core regions 326 becomes a waveguide core 326 when the substrate layer 322 is fully formed. The focal region 328 may be controlled and/or re-positioned in order to provide the core region 326 with a designated shape, such as the shape of the waveguide core 210 (FIG. 2).

In particular embodiments, the light source assembly 334 and/or the stage 330 are controlled so that the waveguide core 326 has a non-uniform refractive index. For example, in some embodiments, the light source assembly 334 and/or the stage 330 is controlled such that the refractive index of the waveguide core 326 would increase as a radial distance from the light-propagating axis increased. In other words, the refractive index would increase in the radial direction. The amount of change is based on, at least in part, the amount of time that a portion of the substrate material is exposed to the laser. The amount of change may also be based on the strength or power of the pulses from the laser. Accordingly, a desired change in the refractive index may be achieved by controlling movement of the light source assembly 335 and/or the stage 330 and by controlling the light energy source 337.

The change in refractive index may be substantially linear or non-linear. For example, the refractive index may increase in a linear or essentially continuous manner from an outer edge of the core to the center of the core. In other embodiments, the refractive index may increase in an exponential manner. Yet in other embodiments, the refractive index may be changed in a step-wise or graded fashion. Thus, the waveguide core may have a graded index or a step index property.

The refractive index contrast or delta between the refractive index of the cladding and the refractive index of the core may be configured such that the refractive index contrast would be less at the second coupling face than the refractive index contrast at the first coupling face. The refractive index contrast may be highest at the first coupling face. The higher refractive index contrast may provide a greater numerical aperture that effectively matches the refractive index contrast of the optical fiber in order to provide low loss coupling. The lower refractive index contrast at the second coupling face may provide a lower or smaller numerical aperture that collimates the light exiting the second coupling face.

It is noted that the channel regions 334 may be etched before or after the core regions 326 are exposed to the light energy. The steps of forming, at 304, the alignment channel 324 and forming, at 306, the waveguide core 326 may be performed utilizing the same light energy source (e.g., laser) 337. For example, the light energy source 337 may be characterized as an ultrafast and/or ultrashort-pulse laser (e.g., femtosecond laser) that is capable of providing ultra-short pulses of light that are within the femtosecond range or shorter. The same objective lens 332 may also be used to form the alignment channel 324 and the waveguide core 326. As such, the forming operations 304, 306 may include overlapping sub-operations. More specifically, the light energy may form the channel regions 334 within the substrate layer 322 and also the core regions 326. The substrate layer 322 may then be exposed to an etchant to remove the substrate material within the channel region.

Methods or processes of modifying substrate material are described in greater detail in Huang, Huan, Lih-Mei Yang, and Jian Liu. "Femtosecond fiber laser direct writing of optical waveguide in glasses." In *SPIE Optical Engineering+Applications*, pp. 81640B-81640B. International Society for Optics and Photonics, 2011; Venturini, Francesco, Maurizio Sansotera, Roberto Osellame, Giulio Cerullo, and Walter Navarrini. "Advances in glass microfabrication femtosecond laser irradiation followed by chemical etching." *Chim Oggi* 30 (2012): 10-12; Vishnubhatla, Krishna Chaitanya, Nicola Bellini, Roberta Ramponi, Giulio Cerullo, and Roberto Osellame. "Shape control of microchannels fabricated in fused silica by femtosecond laser irradiation and chemical etching." *Optics express* 17, no. 10 (2009): 8685-8695; He, Fei, Yang Liao, Jintian Lin, Jiangxin Song, Lingling Qiao, Ya Cheng, and Koji Sugioka. "Femtosecond Laser Fabrication of Monolithically Integrated Microfluidic Sensors in Glass." Sensors 14, no. 10 (2014): 19402-19440; *Femtosecond Laser Micromachining: Photonic and Microfluidic Devices in Transparent Materials*, Editors: Roberto Osellame, Giulio Cerullo, Roberta Ramponi, Volume 123 (2012), Topics in Applied Physics, Springer; and Zhao, Mengjiao, Jie Hu, Lan Jiang, Kaihu Zhang, Pengjun Liu, and Yongfeng Lu. "Controllable high-throughput high-quality femtosecond laser-enhanced chemical etching by temporal pulse shaping based on electron density control." Scientific reports 5 (2015).

However, it should be understood that the steps of forming, at 304, the alignment channel 324 and forming, at 306, the waveguide core 326 may be performed in other manners than those described herein. The alignment channel 324 may be formed within a fiber holder that is distinct from the optical substrate that includes the waveguide core. For example, the fiber holder may be etched or molded to include the alignment channel. In such embodiments, the fiber holder may be attached to the optical substrate such that the alignment channels align with the corresponding coupling faces of the waveguide cores.

After the substrate layer 322 is modified to include the waveguide core 326 and the alignment channel 324, optical fibers 340 may be positioned within the alignment channels 324 and secured to the substrate layer 322. More specifically, end segments 342 of the optical fibers 340 may be secured, at 308, to the substrate layer 322 within corresponding alignment channels 324. For example, an adhesive (e.g., epoxy) may be inserted into the alignment channels 324 before positioning the optical fibers 340 within the alignment channels 324. Alternatively, the adhesive may be inserted into the alignment channels 324 after positioning the optical fibers 340 within the alignment channels 324. In other embodiments, at least portions of the optical fibers 340 may be coated with the adhesive and then inserted into the alignment channels 324.

The method 300 may include coupling, at 310, a plurality of the substrate layers 322 to one another to form a ferrule body 344. In some embodiments, a plurality of the substrate layers 322 may be stacked side-by-side to form a multi-layered ferrule body 344. For example, an adhesive may be applied along a top surface of a first substrate layer 322A and/or a bottom surface of a second substrate layer 322B. The top and bottom surfaces may be pressed together and allowed to cure to bond the first and second substrate layers 322A, 322B to each other. This process may be repeated to form the ferrule body 344. As such, a two-dimensional array 346 of coupling faces 348 may be formed in which each coupling face 348 is configured to transmit an expanded beam of light or receive an expanded beam of light as described herein. At 314, the ferrule body 344 may be used to assemble an optical connector, cable assembly, or a communication device. For example, the ferrule body 344 may be inserted into a housing (not shown). The optical fibers 340 may be bundled or grouped together within a common jacket.

Figure 7:
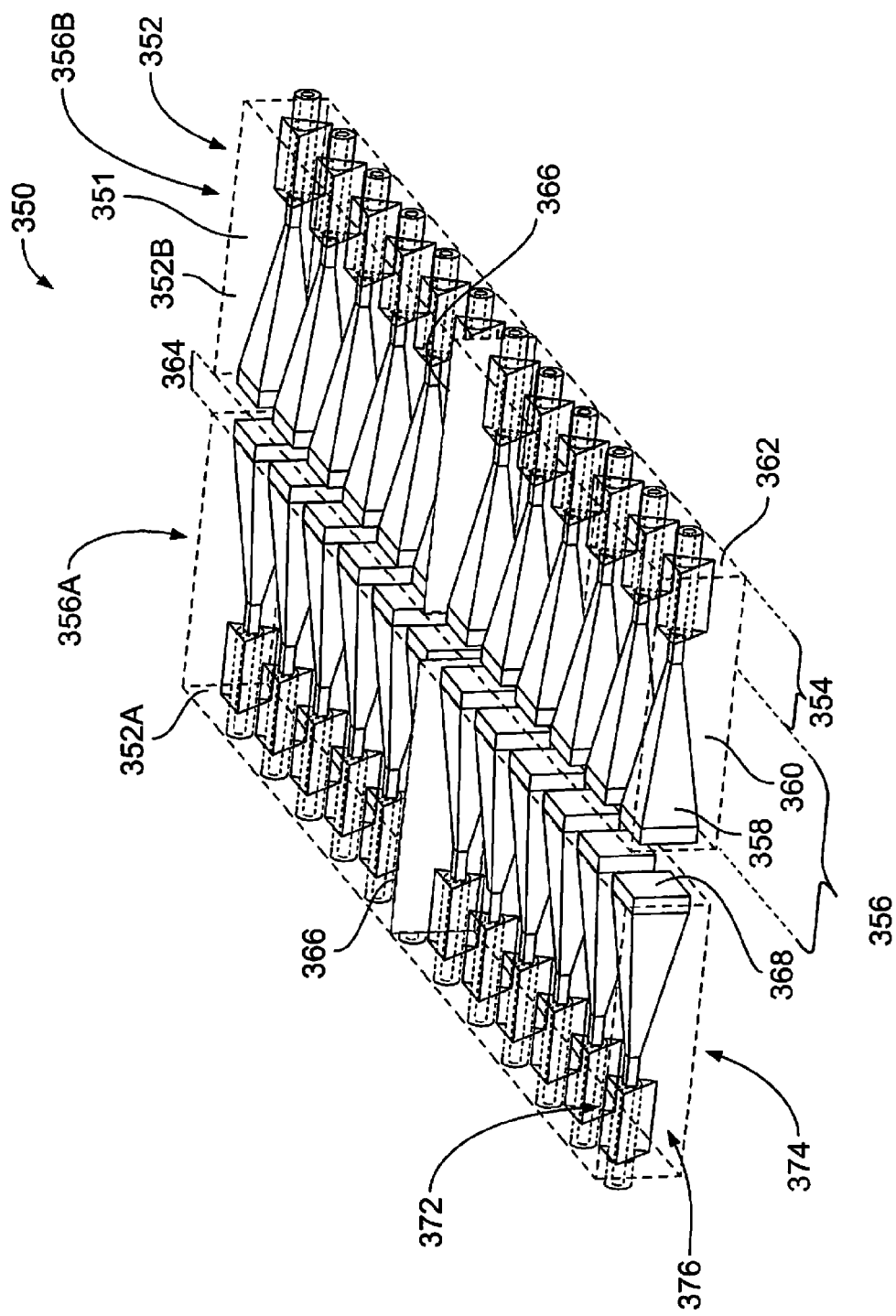
FIG. 7 illustrates a substrate layer that includes a plurality of EB connectors in accordance with an embodiment.

In some embodiments, the substrate layers 322 may be separated, at 312, to form a plurality of discrete components in which each component includes one or more of the EB connectors. For example, the substrate layer 322 may be fractured, etched, diced and the like to form multiple discrete components. FIG. 7 illustrates one process for separating discrete components and/or EB connectors. At 314, the discrete components may be coupled to a common housing (not shown). For example, individual EB connectors may be inserted into corresponding channels of a connector housing. The forming operation, at 314, may provide, for example, an optical cable assembly or a communication device, such as the optical cable assembly 106 (FIG. 1) or the communication device 160 (FIG. 1), respectively.

FIG. 7 is a perspective view of a single substrate layer 350 that has been processed to form a plurality of EB connectors 352. The EB connectors 352 may be similar or identical to the EB connectors 200 (FIG. 2). Each of the EB connectors 352 includes a fiber holder 354 and a 3D waveguide 356. The 3D waveguides 356 include respective waveguide cores 358 that are surrounded by substrate material forming respective claddings 360. The fiber holders 354 include respective alignment channels 362. In the illustrated embodiment, the fiber holders 354 and the 3D waveguides 356 are formed from a common block of substrate material, which may also be referred to as the optical substrate. As shown, the EB connectors 352 include EB connectors 352A, 352B that form first and second rows 356A, 356B, respectively. The first and second rows 356A, 356B of the EB connectors 352A, 352B, respectively, oppose each other. Accordingly, the single substrate layer 350 has been processed to generate a 2×12 array of EB connectors 352.

In an exemplary embodiment, the substrate layer 350 has be subjected to two material modification processes in which, as described above, a focal region of a light source assembly has been directed through the substrate layer 350. During the first material modification process, the focal region was moved through respective channel regions that, after etching, provide the alignment channels 362. During the second material modification process, the focal region was moved through respective core regions that became the waveguide cores 358. The waveguide cores 358 are aligned with respective alignment channels 362.

The substrate layer 350 has also been subjected to multiple etching processes. In one etching process, substrate material of the substrate layer 350 was removed from the channel regions to form the alignment channels 362. In another etching process, substrate material of the substrate layer 350 was removed to separate the first and second rows 356A, 356B. More specifically, a gap 364 was formed between the first and second rows 356A, 356B. The waveguide cores 358 of the first and second rows 356A, 356B have coupling faces 368 that face each other with the gap 364 therebetween. In particular embodiments, the etching process that removes the substrate material for forming the alignment channels 362 may be the same etching process for removing the substrate material that causes the gap 364.

In the illustrated embodiment, the substrate layer 350 was also subjected to an etching process in which adjacent EB connectors 352 were separated from each other. As shown, an etched slot 366 extends vertically between adjacent EB connectors 352. In other embodiments, however, one or more of the EB connectors 352 are not separated from other EB connectors such that a common block of material includes multiple EB connectors 352.

In some embodiments, the substrate layer 350 is selectively etched to form reference surfaces that facilitate locating the EB connectors 352 at designated positions with respect to another component. For example, each of the EB connectors 352 may be configured to include a top reference surface 372, a bottom reference surface 374, and at least one side reference surface 376. The reference surfaces 372, 374, 376 may correspond to one of the side walls 220-223 of the EB connectors 200 (FIG. 2).

Each of the reference surfaces 372, 374, 376 has a predetermined position relative to the 3D waveguide 356 or, more particularly, the coupling face 368 of the corresponding waveguide core 356. When the substrate layer 350 is separated (e.g., diced) to generate a plurality of discrete components, each of the 3D waveguides 356 may have a known location relative to one of the reference surfaces 372, 374, 376. The reference surfaces 372, 374, 376 may enable locating the corresponding EB connector 352 or coupling face 368 at a designated position. For example, one or more of the reference surfaces 372, 374, 376 may engage a surface of a housing or other component of an optical connector or of a communication device during manufacture. In other embodiments, the reference surfaces may be used as a keying or alignment feature that directly engages an opposing optical connector during a mating operation.

Figure 8:
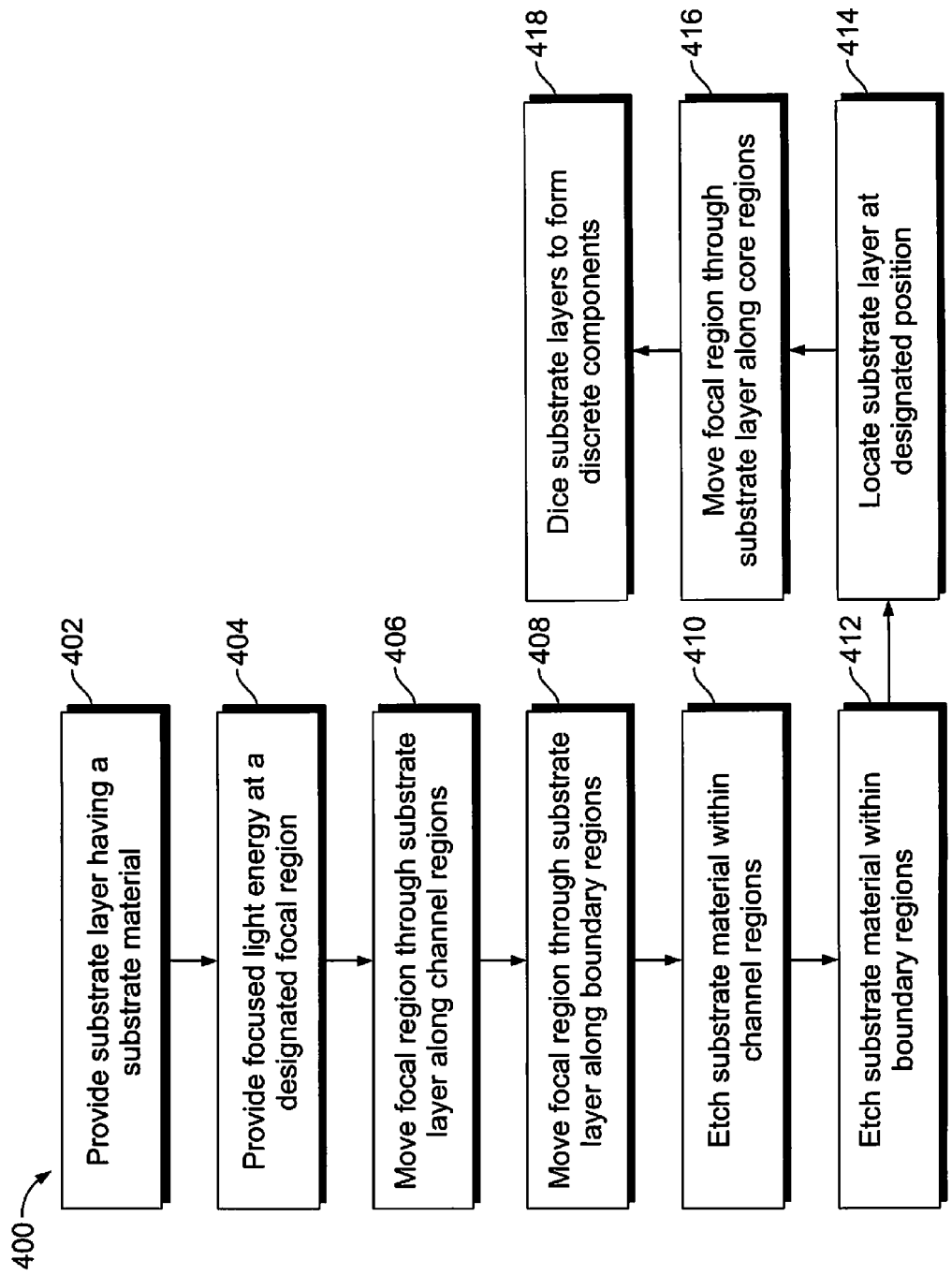
FIG. 8 is a flow chart illustrating a method in accordance with an embodiment.

FIG. 8 is a flow chart illustrating a method 400 in accordance with an embodiment. The method 400 may include one or more steps or processes that are also used to manufacture a single EB connector, a plurality of EB connectors, an optical connector, an optical cable assembly, or a communication device. Accordingly, in some embodiments, the method 400 may be a method of manufacturing an EB connector, an optical connector, an optical cable assembly, or a communication device. The method 400 is described with reference to FIG. 9, which illustrates different stages of the method 400 in accordance with one embodiment. It should be understood that one or more embodiments may include fewer steps or processes than those shown in FIG. 8.

Figure 9:
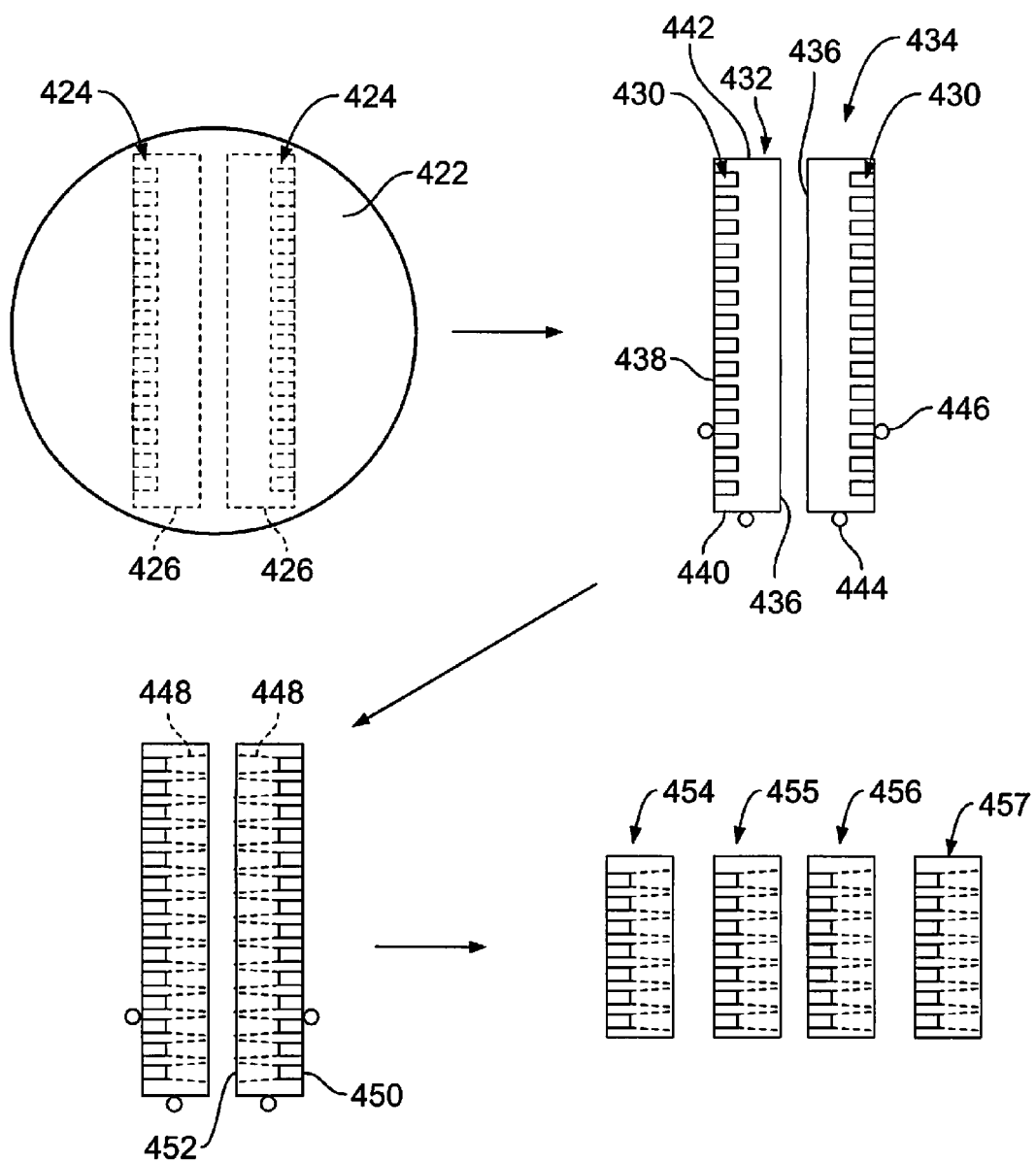
FIG. 9 illustrates different stages of the method of FIG. 8.

The method 400 includes providing, at 402, a first substrate layer (or first working layer) 422 that has a substrate material. In FIG. 9, the first substrate layer 422 includes a glass wafer. The glass wafer may be positioned on a stage, such as the stage 330 (FIG. 6). At 404, focused light energy may be provided at a designated focal region within the substrate layer 422 to modify the substrate material within the focal region. At 406, the focal region is moved through the first substrate layer 422 along a plurality of separate channel regions 424 of the first substrate layer 422. The channel regions 424 are indicated by dashed lines in FIG. 9. In the illustrated embodiment, two rows of channel regions 424 are formed. It should be understood, however, that the channel regions 424 may have different numbers and/or different positions relative to one another than shown in FIG. 9.

Optionally, the method 400 may also include moving, at 408, the focal region through the first substrate layer 422 along boundary regions 426. The boundary regions 426 represent where the first substrate layer 422 will be etched to define an exterior of a second substrate layer (or working layer). During the moving operation at 406 and 408, the light energy at the focal region is controlled to increase the etching rate of the substrate material along the channel regions 424 and boundary regions 426, respectively. The focal region may be moved by moving the stage and/or the light source assembly.

The method 400 also includes etching, at 410, the substrate material within the channel regions 424 to form alignment channels 430. The boundary regions 426 may also be etched, at 412, such that the substrate material is removed and two second substrate layers 432, 434 (or second working layers) are provided. The etching operations at 410 and 412 may occur concurrently or simultaneously. When the boundary regions 426 are etched, the second substrate layers 432, 434 are separated from a remainder of the first substrate layer 422 and this remainder may be removed. During the operation at 408, the boundary regions 426 may be located at known positions relative to the alignment channels 430 or channel regions 424. For example, each of the second substrate layers 432, 434 has a front reference surface 436, an opposite loading reference surface 438, and side reference surfaces 440, 442. Although not indicated, each of the second substrate layers 432, 434 may have top and bottom reference surfaces.

At 414, the second substrate layers 432, 434 may be located at designated or predefined positions on a stage. The second substrate layers 432, 434 may be located using bosses 444, 446 that engage the reference surfaces 440, 438, respectively, of a corresponding second substrate layer. The bosses 444, 446 may be posts or other projections that are capable of engaging the corresponding second substrate layer so that the corresponding second substrate layer has a known position on the stage.

With the positions of the second substrate layers known, the focused light energy may be applied to the second substrate layers to form waveguide cores. More specifically, at 416, the method 400 may include moving the focal region through the corresponding second substrate layer along a plurality of separate core regions 448. The light energy at the focal region is controlled to increase the refractive indexes of the substrate material along the core regions 448. However, the light energy is controlled such that the etching rate is not substantially changed. In other words, the light energy while moving through the channel regions may have a first configuration of parameters and the light energy while moving through the core regions may have a second configuration of the parameters. The core regions 448 form waveguide cores that are surrounded by the substrate material of the cladding. Each of the waveguide cores is shaped to change a mode field diameter of light propagating between first and second coupling faces 450, 452 and to change a numerical aperture of light propagating between the first and second coupling faces 450, 452.

As described above, the waveguide cores may be configured to have a uniform refractive index or a non-uniform refractive index. For example, moving the focal region through the substrate layer 422, at 416, may include at least one of changing parameters of the focused light energy or a speed at which the focal region moves through the substrate material. As such, the cladding 212 and the waveguide core 210 of each of the 3D waveguides 206 may have a non-uniform refractive index contrast. The waveguide cores may have a decreasing refractive index as the cross-sectional area of the waveguide core expands in size. The refractive index contrast (or delta) may reduce as the cross-sectional area of the waveguide core expands. In such embodiments, the light may be more collimated prior to exiting the waveguide core. In some embodiments, the refractive index at a cross-section of the waveguide core decreases in a radial direction away from a geometric center of the waveguide core.

Parameters of the light energy may include pulse duration (width), pulse repetition rate, average power, peak power, and pulse energy. Non-limiting examples of lasers that may be used include Yb-doped laser, Titanium-doped sapphire (Ti:Sapphire) laser, Ytterbium-doped yttrium aluminum garnet (Yb:YAG) laser, Ytterbium-doped potassium gadolinium tungstate (Yb:KGW) laser, Ytterbium-doped potassium yttrium tungstate (Yb:KYW) laser. Polarization may also be controlled for fabricating embodiments described herein.

The refractive index of the substrate material that surrounds the waveguide cores (or cladding) is less than the refractive indexes of the waveguide cores. In some embodiments, the substrate material along the cladding is not exposed to the focused light energy such that the substrate material is essentially unmodified. In other embodiments, however, the substrate material that defines the cladding may be modified to have a designated refractive index.

At 418, the substrate layers 432, 434 may be separated (e.g., diced) to form discrete components, such as third substrate layers 454-457 (or working layers). The substrate layers 454-457 may be stacked side-by-side to form ferrule bodies as described herein. The ferrule bodies may be used to assemble optical connectors, such as those used in optical cable assemblies and communication devices.

Figure 10:
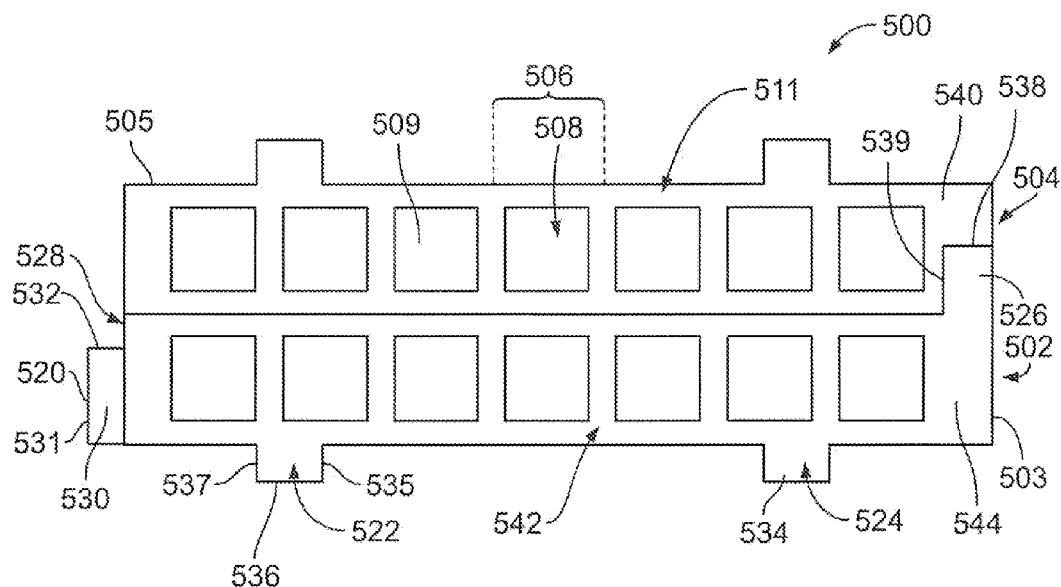
FIG. 10 is a front end view of a ferrule body in accordance with an embodiment.
Figure 11:
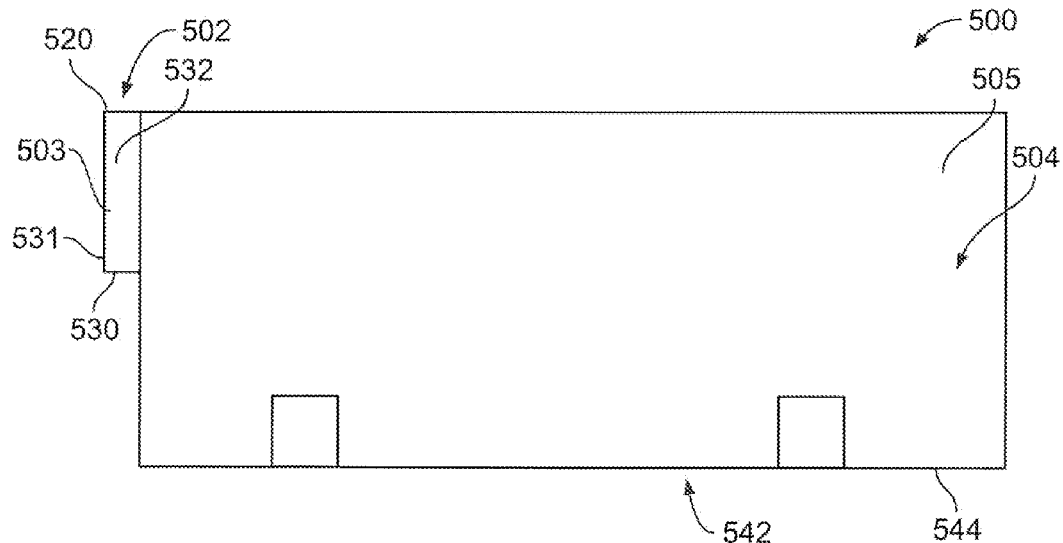
FIG. 11 is a top plan view of a ferrule body of FIG. 10.

FIGS. 10 and 11 show a front end view and a top plan view, respectively, of a ferrule body 500 in accordance with an embodiment. The ferrule body 500 may form an optical connector, such as the first optical connector 102 (FIG. 1) or the second optical connector 104 (FIG. 1). The ferrule body 500 includes discrete first and second substrate layers 502, 504 in which each substrate layer includes a plurality of EB connectors 506 (FIG. 10) having respective 3D waveguides 508. Coupling faces 509 of the 3D waveguides 508 form a two-dimensional array 511. The EB connectors 506 may be similar to the EB connector 200. However, as shown, the EB connectors 506 are part of a common optical substrate. More specifically, the first substrate layer 502 includes an optical substrate 503, and the second substrate layer 504 includes an optical substrate 505. Each of the optical substrates 503, 505 has been locally modified to include a plurality of 3D waveguides 508.

In the illustrated embodiment, each of the optical substrates 503, 505 (or respective substrate layers 502, 504) has been shaped to provide reference surfaces. For example, the optical substrate 503 includes a ledge 520, mating features 522, 524 (FIG. 10), and a stacking feature 526 (FIG. 10). The ledge 520 projects from a side 528 of the optical substrate 503. The ledge 520 has reference surfaces 530-532. The reference surface 530 is a forward-facing ledge surface and the reference surfaces 531, 532 are ledge side surfaces. Each of the mating features 522, 524 includes reference surfaces 534-537. The reference surface 534 is a forward-facing feature surface, and the reference surfaces 535-537 are feature side surfaces. The stacking feature 526 includes reference surface 538, 539 that are oriented perpendicular to each other.

The reference surfaces represent non-planar shapes (relative to surrounding surfaces) that are configured to facilitate assembling the ferrule body 500 and/or mating a corresponding optical connector. For example, the optical substrate 505 includes a stacking feature 540 that is configured to engage and be stacked upon the reference surface 538. The stacking feature 540 and the stacking feature 526 are shaped to have reference surfaces so that the 3D waveguides 508 will have known or designated locations when the ferrule body 500 is fully constructed. The reference surfaces of the mating features 522, 524 are shaped so that the ferrule body 500 is properly aligned with a corresponding optical connector during a mating operation. In the illustrated embodiment, the mating features 522, 524 are flush or even with a front surface 544 of the ferrule body 500 that defines a mating end 542. In other embodiments, however, the mating features 522, 524 may project in a forward direction away from the front surface 544 such that the mating features 522, 524 engage the other connector prior to the front surface 544 engaging or being operably positioned relative to the other connector.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. An expanded beam (EB) connector comprising:
   a fiber holder having an alignment channel that is configured to receive an optical fiber, the alignment channel having a channel opening and extending from the channel opening to a channel end face; and
   an optical substrate including the channel end face, the optical substrate forming a three-dimensional (3D) waveguide that includes a waveguide core and a cladding that surrounds the waveguide core, each of the cladding and the waveguide core being portions of a common substrate material of the optical substrate such that chemical compositions of the cladding and the waveguide core are the same; and
   wherein the waveguide core is locally modified to have a refractive index that is greater than a refractive index of the cladding, the waveguide core extending lengthwise between first and second coupling faces, the first coupling face being aligned with the channel end face and being configured to optically couple to the optical fiber disposed within the alignment channel, wherein the second coupling face has an area that is greater than an area of the first coupling face and a numerical aperture that is less than a numerical aperture of the first coupling face, the waveguide core being shaped to change a mode field diameter of light propagating between the first and second coupling faces.

2. The EB connector of claim 1, wherein the cladding and the waveguide core have a refractive index contrast, which is a difference between the refractive indices of the waveguide core and the cladding, the refractive index contrast being less at the second coupling face than the refractive index contrast at the first coupling face.

3. The EB connector of claim 2, wherein the refractive index contrast reduces as the cross-sectional area of the waveguide core expands.

4. The EB connector of claim 1, wherein the optical substrate includes the fiber holder such that the fiber holder is also a portion of the common substrate material.

5. The EB connector of claim 1, wherein the alignment channel is defined by channel surfaces of the optical substrate that are etched channel surfaces.

6. The EB connector of claim 1, wherein the waveguide core includes a first coupling segment, a second coupling segment, and a mode-converting segment that extends between the first and second coupling segments, the mode-converting segment having a cross-section taken transverse to the propagation of light that increases as the mode-converting segment extends from the first coupling segment toward the second coupling segment.

7. The EB connector of claim 1, wherein the first coupling face is immediately adjacent to the channel end face or forms at least a portion of the channel end face.

8. The EB connector of claim 1, further comprising the optical fiber, the optical fiber being secured to the optical substrate and being a single mode fiber.

9. The EB connector of claim 1, wherein the optical substrate forms a substrate layer, the 3D waveguide being one of a plurality of 3D waveguides in the substrate layer, each of the plurality of 3D waveguides including the waveguide core and the cladding as portions of the common substrate material such that chemical compositions of the claddings and the waveguide cores are the same.

10. The EB connector of claim 1, wherein a light-propagating axis extends along a geometric center of the waveguide core, the waveguide core having a non-uniform refractive index in which the refractive index of the waveguide core is different at different radial distances from the light-propagating axis.

11. An expanded beam (EB) connector comprising:
a fiber holder having an alignment channel that is configured to receive an optical fiber, the alignment channel having a channel opening and extending from the channel opening to a channel end face; and
an optical substrate including the channel end face, the optical substrate forming a three-dimensional (3D) waveguide that includes a waveguide core and a cladding that surrounds the waveguide core, each of the cladding and the waveguide core being portions of the optical substrate; and
wherein the waveguide core is locally modified to have a refractive index that is greater than a refractive index of the cladding, the waveguide core extending lengthwise between first and second coupling faces, the first coupling face being aligned with the channel end face and being configured to optically couple to the optical fiber disposed within the alignment channel, wherein the second coupling face has an area that is greater than an area of the first coupling face and a numerical aperture that is less than a numerical aperture of the first coupling face, the waveguide core being shaped to change a mode field diameter of light propagating between the first and second coupling faces, wherein the cladding is formed from a substrate material of the optical substrate that also surrounds the alignment channel.

12. The EB connector of claim 11, wherein the optical substrate forms a substrate layer, the alignment channel being one of a plurality of alignment channels in the substrate layer, the 3D waveguide being one of a plurality of 3D waveguides in the substrate layer, wherein the claddings are formed from the substrate material that also surrounds the alignment channels.

13. An optical cable assembly comprising:
an optical cable including a bundle of optical fibers, each optical fiber having a respective end segment; and
a ferrule body having a plurality of alignment channels and a plurality of 3D waveguides, each of the alignment channels having the end segment of a corresponding optical fiber disposed therein, wherein each of the 3D waveguides of the plurality of 3D waveguides is aligned with a corresponding alignment channel, each of the 3D waveguides including a waveguide core and a cladding that surrounds the waveguide core, each of the cladding and the waveguide core being portions of a common substrate material;
wherein the waveguide core of each 3D waveguide is locally modified to have a refractive index that is greater than a refractive index of the cladding, the waveguide core extending lengthwise between first and second coupling faces, the first coupling face being aligned with a corresponding alignment channel of the ferrule body and being configured to optically couple to the optical fiber disposed within the corresponding alignment channel, wherein the second coupling face has an area that is greater than an area of the first coupling face and a numerical aperture that is less than a numerical aperture of the first coupling face, the waveguide core being shaped to change a mode field diameter of light propagating between the first and second coupling faces.

14. The optical cable assembly of claim 13, wherein the cladding and the waveguide core of each of the 3D waveguides have a refractive index contrast, the refractive index contrast being a difference between the refractive indices of the waveguide core and the cladding of the corresponding 3D waveguide, the refractive index contrast being less at the second coupling face than the refractive index contrast at the first coupling face.

15. The optical cable assembly of claim 13, wherein the ferrule body includes a substrate layer that includes at least some of the 3D waveguides, the substrate layer comprising the substrate material.

16. The optical cable assembly of claim 15, wherein the alignment channels are defined by channel surfaces of the substrate layer, the channel surfaces being etched channel surfaces.

17. The optical cable assembly of claim 15, wherein the ferrule body includes a plurality of the substrate layers, each of the substrate layers including multiple 3D waveguides disposed therein, the substrate layers being stacked side-by-side.

18. The optical cable assembly of claim 17, wherein the substrate layers collectively form a mating end of the ferrule body that includes the second coupling faces, the second coupling faces forming a two-dimensional array at the mating end.

19. The optical cable assembly of claim 13, wherein each of the waveguide cores includes a first coupling segment, a second coupling segment, and a mode-converting segment that extends between the first and second coupling segments, the mode-converting segment having a cross-section taken transverse to the propagation of light that increases as the mode-converting segment extends from the first coupling segment toward the second coupling segment and a numerical aperture that decreases between the first and second coupling faces.

20. The optical cable assembly of claim 13, wherein a light-propagating axis extends along a geometric center of the waveguide core, the waveguide core having a non-uniform refractive index in which the refractive index of the waveguide core is different at different radial distances from the light-propagating axis.

* * * * *